Patented Feb. 13, 1923.

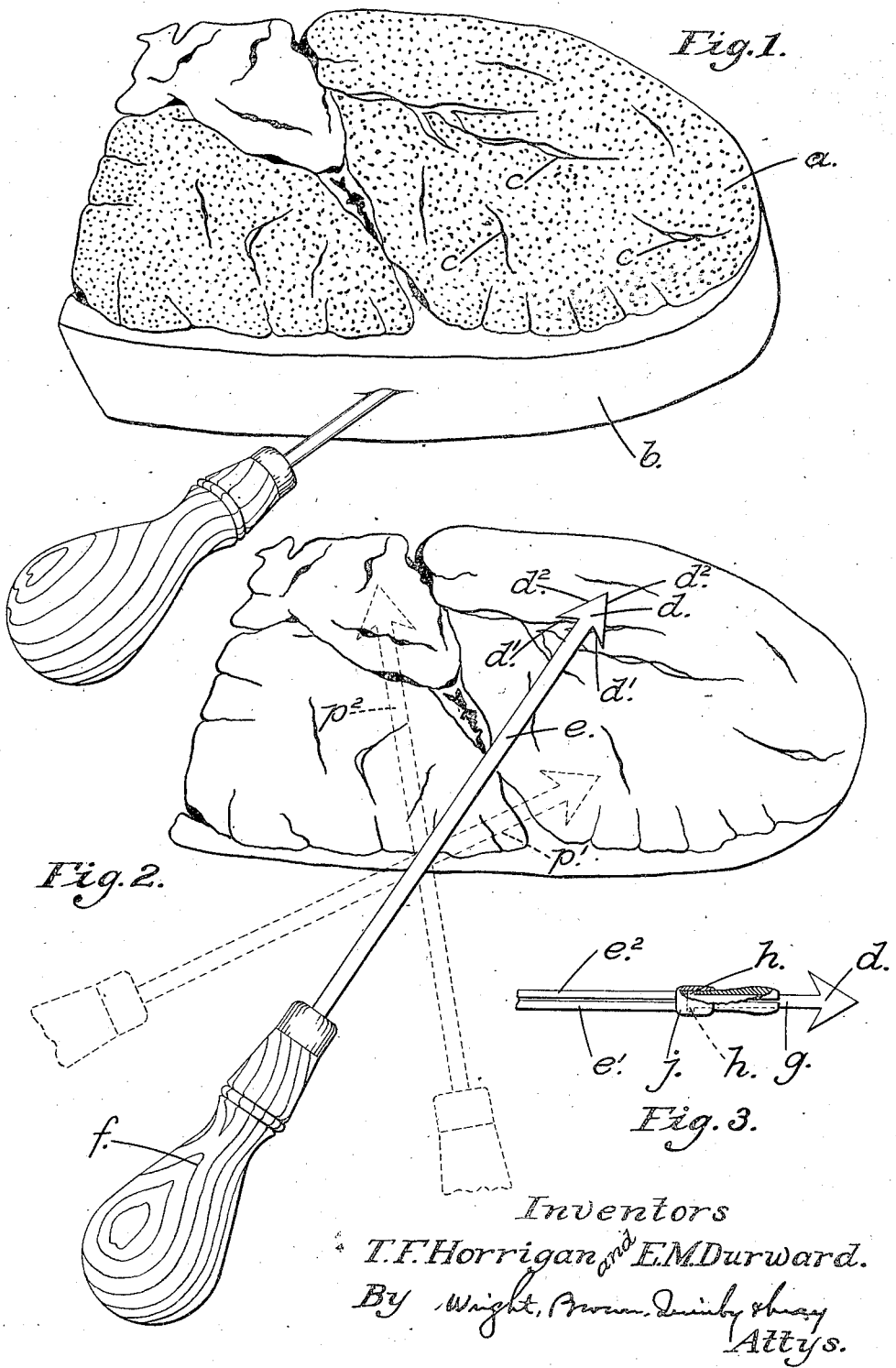

1,445,018

UNITED STATES PATENT OFFICE.

THOMAS F. HORRIGAN, OF REVERE, AND ELSIE M. DURWARD, OF BOSTON, MASSACHUSETTS, ASSIGNORS OF ONE-THIRD TO WALTER V. NEAL, OF MALDEN, MASSACHUSETTS.

METHOD AND MEANS FOR MAKING MEAT TENDER.

Application filed June 28, 1922. Serial No. 571,370.

*To all whom it may concern:*

Be it known that we, THOMAS F. HORRIGAN and ELSIE M. DURWARD, citizens of the United States, residing, respectively, at Revere and Boston, both in the county of Suffolk and State of Massachusetts, have invented new and useful Improvements in Methods and Means for Making Meat Tender, of which the following is a specification.

The result sought by the present invention is to make meat tender and particularly to do so without scoring the surfaces of the piece of meat which is treated for that purpose. Pieces of meat in the nature of steaks and chops are those in connection with which it has its field of greatest usefulness. although we do not by this statement intend to exclude from the protection of our claims any kind of pieces upon which the method may be practiced. Pieces of the sort indicated are usually in the form of slices of more or less uniform thickness and with opposite faces which are more or less nearly parallel.

It is well known that many cuts of meat are not suitable for eating in the form of steaks and chops because of being too tough and this is particularly true of beef; but it is equally well known that some of the tough parts of beef are also the juiciest and best flavored parts.

The cause of the tough condition of the meat is largely due to the presence of tough tendons and strings of gristle or some other substance which is not susceptible of mastication and the presence of which in sufficient quantity prevents the edible meat tissue from being masticated. Practically in order to make use of the edible qualities of such parts of the meat they must be cooked in such a way that the original flavor is lost or changed. It is the object of our invention to enable meat of this sort to be so treated that it can be readily and thoroughly masticated when cooked in a manner to retain the original flavor—that is, the manner in which steaks and chops are usually cooked, and to apply the treatment in such a way as to leave the surfaces of the piece of meat intact and so in a condition to retain the juices of the meat.

Our invention consists both in a new mode of treating meat as and for the purposes above stated and in a tool particularly designed, adapted and intended for carrying out this treatment, the characteristics of which in detail are explained in the following specification in connection with the drawing.

In the drawing,—

Figure 1 is a perspective view showing a raw beefsteak with the tool which we have devised for the purposes of this invention inserted therein to perform the steps in which the method consists.

Figure 2 is a perspective view representing the steak as though cut through on the plane in which the tool is inserted, and illustrating the way in which the tool is manipulated to effect the desired result.

Figure 3 is a fragmentary sectional view of a special form of tool having a detachable blade and adapted for the purpose in view.

In Figures 1 and 2 $a$ represents a piece of steak having a layer of fat $b$ on the edge and containing among the fibers of edible tissue tendons or strings $c$, $c$ of gristle or whatever material it is that, interspersed among the edible meat, interferes with mastication.

In order to make the meat easily masticatable but without destroying its superficial integrity, we have provided a cutting tool which is adapted to be inserted in the interior of the meat from one edge and to be moved by manipulation here and there to any extent desired throughout the interior wherever necessary to cut gristle and tough tendons. Such tool consists of a short blade $d$ on the end of a narrow shank $e$, the latter being preferably mounted in a suitable handle $f$. Important characteristics of the blade are that it is wider than the shank and has cutting edges $d'$, $d'$ between the shank and its outermost points, as well as cutting edges $d^2$, $d^2$ between these outermost points and its forward points, and that its extreme width is at the same time so narrow that it may be turned in a plane perpendicular to the faces of the meat without protruding through either face. Having regard to the fact that different kinds of meat may be cut into steaks or chops of greater or less thickness, the absolute width of the blade may be more or less in a specific tool, according as the tool is to be used with thin or thick pieces. Relatively to the meat, however, the width of the blade is always preferably less than the thickness of the piece. Practically, and having regard to the fact that, ordinarily, steaks are cut with a thickness not much exceeding one inch, and seldom more than two inches, the preferred width of the blade is between one quarter and three-quarters of an inch. Of course a blade narrow enough to be used with thin pieces of meat can likewise be used with those of the greatest thickness.

In using the tool thus characterized to perform the method in which our invention resides, the tool is grasped by the handle and the blade is plunged into the meat from one edge approximately midway between the opposite surfaces as shown in Figure 1. It is then moved back and forth to any point where the strings of gristle and tough tendons are found, and in addition it is preferably pushed in and drawn back many times accompanied by lateral shifting of the blade between inward and outward movements. That is, referring to Figure 2, it may be assumed that the cutting tool is so moved and shifted angularly to the positions indicated by dotted lines P' and P², and to any other position in the area about the point of entrance as a center.

Preferably in making the incising motions the blade is held at an inclination to the opposite surfaces of the piece rather than squarely parallel thereto, which is the position indicated in Figure 2. When held at an inclination the cuts made not only sever the bits of tough gristle but they also cut the edible tissue. By thus moving the cutter into a large enough number of different positions and giving it an inward thrust and an outward pull in each position, accompanied, if desired, by a twisting movement of the whole tool, the interior mass of the meat will be more or less thoroughly cut up into partially severed slices. Then after the operation has been carried out as extensively as desired at one point of entry, the tool may be withdrawn and inserted at another point, and the operation repeated there; and the whole process may be repeated continuously at a large number of different points at the same or different sides of the piece. In this way the tough parts in the interior of the piece can be so thoroughly disintegrated that when the meat is eaten no appreciable suggestion of the original toughness remains. In this manner the toughest meat may be made equal, in its capacity for mastication, to the tenderest of untreated meat.

In all this operation the cutting tool remains inside of the meat without ever cutting through the surface, or if it should, by accident, cut through, the surface cuts are so few and infrequent that there is no liability of the piece falling apart. That is, the external integrity of the meat is substantially preserved and so is its ability to retain the meat juices while being cut. We have noted, in cooking meat treated according to our method, that while being broiled or cooked on a hot pan, little or none of the juices escape, and upon being eaten after cooking the original juices are present in substantially full measure.

Referring to the cutting tool, an additional preferred characteristic is that the rear cutting edges $d'$, $d'$ incline outwardly away from the shank and away from the forward point. While this characteristic may be omitted within the scope of the protection which we claim, nevertheless it is of value as a means for insuring that tough strings of gristle will be cut, because anything that lies between the path of either lateral point and the shank during the withdrawing movement of the cutter will be drawn inward and will surely be cut. That is, this particular formation of the blade prevents the tough strings from being pushed aside without being cut, as might occur if the edges made an obtuse angle with the shank and were not particularly sharp.

For some purposes it is preferable to make the blade of the cutter detachable from the shank, so that a new cutter may be substituted if one previously in use is broken or becomes dull, and to avoid the need of sharpening a dull blade. One of the various possible constructions of blade and means for detachably securing it to the shank is indicated in Figure 3. Here the shank of the tool is made of two half tubes $e'$, $e^2$, or at least that end which holds the blade is so made, these semi-tubes being placed edge to edge. The blade $d$ has a short shank $g$ on the extremity of which are two lateral shoulders $h$, $h$ which are adapted to enter holes in the opposite sides of the tubular shank $e'$, $e^2$. The outer ends of these tubular members being spread apart, the integral tool shank $g$ is inserted into the open end until its shoulders reach the holes in the semi-tubes, when the latter are permitted to spring together. A sleeve $j$ sliding on the tubular shank is then slipped outward until arrested by an enlargement of the extremity of the tubular shank (in which position it embraces the shoulders) and so locks the shank and blade together and prevents the latter from being pulled out and left in the meat. Other modes of detaching and applying the blade to the shank may be used, or the blade and shank may be made integral with one another if desired.

What we claim and desire to secure by Letters Patent is:

1. The method of making meat tender which consists in cutting the interior of a piece of meat, substantially without cutting the surfaces of the piece.

2. The method of making meat tender which consists in incising the interior of a piece of raw meat from an edge thereof.

3. The method of making meat tender which consists in incising the interior of a piece of raw meat from an edge thereof and limiting the cuts so made substantially to the interior of the piece.

4. The method of making meat tender which consists in inserting into a piece of meat, from an edge and between the faces thereof, a cutting blade, and moving said blade back and forth in different directions from its point of entrance.

5. The method of making meat tender which consists in inserting into a piece of meat, from an edge and between the faces thereof, a cutting blade, and moving said blade back and forth in different directions from its point of entrance, at the same time so manipulating such blade as substantially to prevent it from protruding from the faces of the piece.

6. The method of making meat tender which consists in inserting into the interior of a piece of meat, from an edge thereof between its faces, a blade on the end of a shank, which blade has greater width than the shank and has cutting edges both at front and rear, and moving such blade back and forth in the interior of the piece in different directions from the point of entrance.

7. The method of making meat tender which consists in inserting into the interior of a piece of meat, from an edge thereof between its faces, a blade on the end of a shank, which blade has greater width than the shank, but less than the thickness of the piece of meat, and has cutting edges both at front and rear, and moving such blade back and forth in the interior of the piece in different directions from the point of entrance.

8. The method of making meat tender which consists in inserting into the interior of a piece of meat, from an edge thereof between its faces, a blade on the end of a shank, which blade has greater width than the shank and has cutting edges both at front and rear, and moving such blade back and forth in the interior of the piece in different directions from the point of entrance, at the same time inclining the plane of the blade to the broad surfaces of the piece of meat.

9. The method of making meat tender which consists in inserting into a piece of meat, from an edge and between the faces thereof, a cutting blade, and moving said blade back and forth in different directions from its point of entrance, withdrawing the blade and re-inserting it at a different point of entrance, and then similarly manipulating it from the new point of entrance.

10. The method of making meat tender which consists in inserting into the edge of a piece of meat, a cutting tool having a slender shank and a blade of greater width than said shank, which blade has cutting edges both at front and rear and the rear edges making less than an obtuse angle with the shank, the width of the blade also being less than the thickness of the piece of meat, and manipulating said blade by moving said tool endwise in different directions from the point of entrance and in such manner as to incise the interior of the piece and to preserve substantially the integrity of the surfaces of the piece.

11. A tool for use in performing the method herein set forth comprising a relatively slender shank and a blade of greater width than said shank carried thereby, said blade having cutting edges at both front and rear, whereby it is enabled to cut when being pushed into, and also when being withdrawn from, a piece of meat.

12. A tool for use in performing the method hereinbefore disclosed which comprises a relatively slender shank and a blade on the end of said shank, which blade is of greater width than the shank and projects laterally on different sides thereof, with both forward and rear cutting edges, the rear cutting edges being arranged at acute angles with the shank, whereby in being withdrawn from the interior of a piece of meat, such rear edges tend to draw tough fibers of the meat substance toward the shank and insure cutting of such fibers.

In testimony whereof we have affixed our signatures.

THOMAS F. HORRIGAN.
ELSIE M. DURWARD.